ately fabricated. For example, the polyol containing

United States Patent Office 3,532,527
Patented Oct. 6, 1970

3,532,527
PERMEABLE SEPARATORY MEMBRANES
William Eugene Skiens, Concord, Calif., assignor to The Dow Chemical Company, Midland, Mich., a corporation of Delaware
No Drawing. Filed Nov. 4, 1966, Ser. No. 591,992
Int. Cl. C08b 21/04, 29/10; B29d 27/00
U.S. Cl. 106—176                                    10 Claims

ABSTRACT OF THE DISCLOSURE

Permeable membranes are prepared from film-forming cellulose esters admixed with a suitable amount of a plasticizer for the ester and a polyol. The membranes may be prepared as sheets, tubes, etc. but preferably as fine hollow fibers. Following fabrication of the membrane it is leached to remove the plasticizer and polyol by a solvent which is a non-solvent for the cellulose ester. The polyol provides the membranes with greatly increased permeabilities to water.

The present invention relates to permeable membranes and compositions for their manufacture.

Permeable membranes have been developed in a variety of shapes such as flat membranes, tubular membranes as discussed in U.S. 2,411,238, and the more recently developed permselective hollow fiber membranes as discussed in 3,228,876 and 3,228,877.

A diversity of membranes are known which, to various degrees, have the property of being selectively permeable to different components of fluid mixtures. Thus, some membranes will pass water while restraining ions, other membranes will selectively pass ions in solution. Still other membranes possess selective permeation rates for two or more non-ionic components of fluid mixtures. Additional types of membranes are the so-called molecular sieve type, such as those used for dialysis. These latter type of membranes can oftentimes pass ions or other materials but tend to restrain passage of high molecular weight components or are adapted to pass only certain molecular weight fractions of given materials, depending on actual molecular size and proportions thereof.

It is often difficult, however, to tailor a membrane having the permselectivity necessary for a given separation. Frequently the permeability behavior of a membrane may be unsatisfactory, inefficient and furthermore, highly unpredictable. It would be of tremendous advantage and expedience if one could take a given polymer and prepare membranes having some pre-designed permeability, thus being able to utilize the same equipment and apply the same general handling techniques and polymer technology. For example, it would be beneficial to be able to consistently provide a permeable membrane of a given polymer having high efficiency in passing fluids and low molecular weight compounds while restraining higher molecular weight materials, for instance, one which could be utilized in an artificial kidney structure which would have high water and urea permeability (clearance) but would not allow the passage of high molecular weight protein material (i.e., albumin, etc.). On the other hand, to be versatile enough to take the same polymer and prepare a membrane having high water permeability and high salt rejection would be of significant value. In most liquid separations, aqueous systems are encountered and water is to be separated or recovered. Hence, it is of prime interest to enhance the water permeability of a membrane to make the separations most efficient.

It is frequently encountered that there are significant differences between the efficiency or selectivity of a separatory membrane even when the same polymeric material is used to make the membrane, but different methods of manufacture of the membrane are employed. Thus, many of the suitable membrane-forming materials are susceptible to being fabricated into a membrane shape by wet, dry or melt extruding. It has been found, however, that wet extrusion has several attendant disadvantages for the manufacture of permselective membranes. Among these disadvantages is the relative slow speed at which wet extruding permits the manufacture of such structures. Also, there is a general tendency for dry or even wet extruded membranes to have rough and irregular surfaces which are inclined toward pin holes, obviously reducing the efficiency of the separation and the life of the membrane. Additionally, it is usually required that wet extruded membranes must be dried before they can be efficiently and effectively potted or sealed in a separatory seal, and as a result of the drying, it is generally observed that the permeation properties are undesirably or unacceptably low.

Melt extruding of separatory membranes is a preferred method of manufacturing separatory membranes because of the relative speed at which such membranes can be fabricated and the regularity and uniformity of the resulting product. In the case of hollow fiber membranes, it is especially advantageous to utilize melt spinning techniques since hollow fiber membranes of excellent uniformity having small diameters and extremely thin walls can be produced at high speeds.

Accordingly, it is among the chief objects and primary concerns of this invention to provide a composition for preparing permeable membranes of a synthetic thermoplastic polymeric material that are selectively permeable and capable of providing excellent transfer rates and effecting excellent separations and purifications in separatory processes.

It is a further object to provide separatory membranes that have significantly enhanced water permeability over their normal water permeability values.

The foregoing and additional objects and cognate benefits and advantages are accomplished in and by practice of the present invention which comprises, providing a melt extrudable composition for preparing permeable membranes comprised of a film-forming cellulose ester and a suitable amount of a mixture comprised of (1) a plasticizer for the cellulose ester and (2) a polyol.

The amount of the plasticizer that is employed in the present compositions should be enough to suitably plasticize the cellulose ester such that when the composition is subjected to a melt extrusion operation the mass will have a melting point lower than that of the unplasticized cellulose ester. The amount of plasticizer in addition should be enough to provide an easily and efficiently melt extrudable composition.

The amount of the polyol, for example diethylene glycol, that is incorporated with the plasticizer is enough to significantly increase at least the water permeability of the membrane that is fabricated from the plasticized mass.

The permeability membranes that are prepared according to the present invention are highly efficient and provide excellent separatory membranes having permeation properties frequently equally as good and often better than the conventional dialysis membranes prepared from regenerated cellulose, while at the same time having many other advantages over such regenerated cellulose membranes, for instance higher mechanical strength.

The important feature of the present invention is the addition of a polyol to the plasticizer in providing the plasticized cellulose ester from which the membrane is ultimately fabricated. For example, the polyol containing mixture will frequently provide membranes with a water permeability on the order of 15 to 20 times higher than that obtained with membranes prepared with an equal amount of the plasticizer employed by itself. On the other hand, the polyols are normally very poor plasticizers for the cellulose esters and when used alone polyols are not compatible with a molten cellulose ester composition for melt extruding a permeable membrane.

Among the many demands imposed upon a plasticizer that is to be employed in the manufacture of permeable membranes by melt extrusion techniques are: (a) it must be capable of attaining a low enough melt viscosity of the polymer composition to permit extruding a membrane (whatever its shape) at a low enough temperature so that deleterious polymer degradation does not occur; (b) a plasticizer must have a sufficiently low vapor pressure such that significant loss thereof does not occur during the extrusion operation; (c) the extruded plasticized membrane must have sufficient tensile strength and rigidity to permit it to be taken up by a suitable winding or other collection technique; (d) the plasticizer in the extruded membrane must be readily and essentially completely removable, and both before and after removal of the plasticizer, the membrane must have sufficient tensile strength and rigidity to permit construction of useful permeability separatory elements and apparatus; and (e) the membrane after removal of the plasticizer must have the requisite permeability properties and, as mentioned, preferably, the membrane should have a relatively high water permeability coefficient. Additionally, it is most necessary that the chosen plasticizer, in the presence of the polymer mass, have a boiling point above the chosen or necessary temperature for the melt extrusion of the membrane.

The plasticizer for the cellulose ester that is employed in the practice of the present invention is a plasticizer that is selectively soluble in a solvent that is a non-solvent for the cellulose ester, and advantageously that is soluble in a solvent for the polyol, e.g. water. The plasticizer and polyol can, if desired, be leached from the membrane with an organic water-soluble solvent which can subsequently be leached with water. Preferably, water-soluble plasticizers are employed so that leaching can be directly accomplished with water leaving a water swollen membrane ideally suited as a separatory membrane. Beneficially and preferably the plasticizers employed are a sulfolane compound and particularly tetramethylene sulfone (which in the art is itself frequently referred to as "sulfolane") and ring-substituted derivatives thereof such as 3-ol esters and ethers as discussed in U.S. 2,219,006 and U.S. 2,451,299. Preferably, the plasticizers for the cellulose esters that are employed in the present invention are represented by the structural formula:

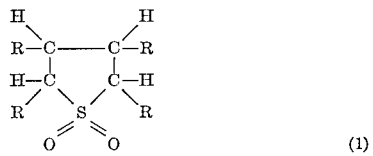

(1)

wherein R represents hydrogen or a methyl radical. As mentioned, sulfolane preferably is employed, i.e., with reference to Formula 1 when each R is hydrogen. Other plasticizers that can be employed include dimethyl sulfoxide, 2-pyrolidone, gamma-butyrolactone, malononitrile, dibutyltartrate, dimethylphthalate, diethylphthalate, triacetin, triphenylphosphate, tributylphosphate, cyclic acetal, di-(methoxyethyl) phthalate, tetramethylene sulfoxide, caprolactam and gamma-valerolactone.

The polyols that are added with the plasticizer in the present mixtures are those having at least 2-hydroxyl groups in the molecule. The molecular weight of the polyol and the particular polyol employed can be varied and the choice will depend on the particular cellulose ester employed and the end result desired. Some of the higher molecular weight polyols may become incompatible with the system. Also, if salt rejection of the membrane is desired a particular polyol or amount thereof may be beneficial, whereas a different polyol or amount thereof may provide free salt (or low molecular weight material) transfer through the membrane. In any event, once the end result is in sight, one can achieve it by proper adjustments according to the present teaching. Exemplary of some of the polyols that can be employed are ethylene glycol, diethylene glycol, triethylene glycol, tetraethylene glycol, etc. and including propylene glycol, dipropyene glycol, etc. and mixtures of ethylene and propylene glycol units and such other polyols as glycerine and the like.

When the cellulose ester is cellulose triacetate, for example, it is advantageous to employ polyols having a molecular weight up to about 4,000 or so. Beneficially, polyols having a molecular weight from about 106 (e.g., diethylene glycol) up to about 2,000 are used in the practice of the present invention when cellulose triacetate is the membrane forming material. It is frequently observed that the permeability properties of the cellulose triacetate membrane increase very rapidly and dramatically as the molecular weight of the polyol increases from about 106 up to about 2,000 or so and then tend to decrease at about the same rate up to about 4,000 or so. Ordinarily, polyols of molecular weight greater than about 5,000 become increasingly incompatible with the cellulose triacetate system such that it becomes impossible or impractical to fabricate an efficient permeable membrane structure. However, with cellulose diacetate, for instance, polyols having a molecular weight up to about 20,000 or more may be successfully employed.

Depending upon the molecular weight and specie of cellulose ester employed and the extrusion temperatures desired, the amount of the plasticizer may vary over a prescribed range as has been indicated before. Also, certain of the plasticizers may be more compatible and provide better results with certain of the cellulose esters. Once the amount of plasticizer to be employed has been established, then a suitable amount of polyol can be incorporated to modify the permeability properties of the membrane to any particular degree. For example, the freedom of salt, such as sodium chloride, to pass through the membrane can be tailored so that almost total salt rejection, i.e., no salt passing through the membrane, to complete permeation of salt can be achieved. Thus, only small amounts of the polyol need be added before significant increases in the permeation properties of the membrane are observed. Generally, larger amounts of polyol lead to increased permeability of salt and low molecular weight material.

The amount of the mixture of the plasticizer and polyol utilized with the cellulose ester is generally from about 15 to about 60 weight percent based on total composition weight. Particularly advantageous results are achieved when the weight ratio of the plasticizer to polyol in the mixture is from about 0.66:1 to about 5:1. The permeability properties can also be modified by varying the weight ratio of plasticizer and polyol within the foregoing indicated range. Especially beneficial results are achieved as regards high water permeability and low molecular weight material permeability when the ratio of the plasticizer compound to polyol is from about 0.8/1–1.3/1.

The cellulose esters that are employed are of the film-forming variety and include such materials as cellulose mono-, di-, and tri-acetates, cellulose propionate, cellulose butyrate, cellulose acetate propionate, cellulose acetate butyrate, etc. and mixtures thereof.

The present compositions are suitable to be melt extruded by known techniques into a variety of shapes that may be required for any particular separatory device or system. For example, a film or sheet of the material may be fabricated, or tubes and, with particular expedience, membranes in the form of fine filamentary hollow fibers, i.e., having a hollow continuous fluid conducting core, can be extruded or spun from these compositions.

In the preparation of the mixtures prior to extrusion into a desired shape, the cellulose ester polymer and plasticizer are mixed preferably prior to the creation of the melt from which the membrane is extruded. Mixing can be accomplished in any convenient manner, the important feature is to obtain an intimate uniform mixture. One desirable means is to dry blend the ingredients.

Immediately following extrusion the membrane is advantageously rapidly cooled to a solid shape. One means to accomplish this is to pass the membrane through air or some other inert gaseous medium.

Extrusion temperatures should be as low as practicable to avoid polymer degradation while taking into consideration the ease of extrusion. For instance, when extruding a cellulose triacetate composition, temperatures much above about 285° C. should be avoided, if possible. Advantageously and preferably, when cellulose triacetate is involved, extrusion temperatures between about 200 and 285° C. are employed. The necessary temperature can be determined once the ingredients and amounts thereof are established.

The extruded membrane after having been cooled can be passed directly through a leaching bath to remove the plasticizer and polyol or the membrane can be taken up on a spool or roll and stored for any desired length of time before leaching or removing the plasticizer. The leaching treatment can be carried out by any convenient means such as by passing the fibers through a bath of a selected solvent, or by semi-batch immersion of a spool or roll of the collected membrane. The plasticizer-polyol-containing membrane can be, on the other hand, stored until it is desirable or convenient that it be fabricated into a suitable separatory apparatus and leached at that time. Alternatively, the plasticizer-polyol-containing membranes can be actually installed in a separatory cell or apparatus and the plasticizer-polyol mixture leached from the membrane just prior to putting the separatory cell into operation. For that matter, in order to avoid degradation of the permselective properties of the membrane, it is desirable to maintain the membrane in a wet or immersed state once the mixture is leached therefrom. The ability to store the membrane over an extended period of time before removal of the plasticizer-polyol mixture is a prime advantage particularly under circumstances whereby the leached membrane would tend to dry out and lose its efficiency.

The following examples will serve to further exemplify the present invention.

EXAMPLE 1

Cellulose triacetate (43.6% acetyl) was dry blended with a 1:1 mixture by weight of sulfolane (tetramethylene sulfone) and a polyethylene glycol having a molecular weight of about 200 (i.e., a polyethylene glycol containing about 4 ethylene oxide units). The ratio of the mixture of sulfolane and polyethylene glycol to the cellulose triacetate was about 0.8:1 (by weight). After thoroughly mixing, the plasticized cellulose triacetate was molded in a small hydraulic press at 200° C. to form a film. Subsequently, the sulfolane and polyethylene glycol were leached from the film in a water bath at 50° C. Upon testing the permeability properties of the film, it was observed that the water permeability of the film was about 8 times that of commercial dialysis tubing (i.e., regenerated cellulose) and that salt (NaCl) diffused freely through the membrane.

EXAMPLE 2

The procedure of Example 1 is repeated excepting to employ dimethyl phthalate in place of the sulfolane and to employ a polyethylene glycol having a molecular weight of about 400. The membrane produced is first leached in ethanol for about one-half hour at 50° C. and subsequently washed with water. The permeability properties of the film are essentially commensurate with the excellent results obtained with the membrane in Example 1.

EXAMPLE 3

A blend containing about 55.5 weight percent cellulose acetate (40% acetyl—25 seconds ASTM falling ball viscosity), about 22.2 weight percent sulfolane and about 22.2 weight percent of a polyethylene glycol having a molecular weight of about 200 was molded in a hydraulic press with heated platens at about 125° C. The membrane after cooling was leached in 70° C. water and tested for its permeability properties utilizing an aqueous about 3.5% sodium chloride solution. The water permeability of the membrane was observed to be approximately ten times that of a commercial dialysis membrane and no salt was retained by the membrane, i.e. the membrane had essentially zero salt rejection.

EXAMPLE 4

A blend of about 66.7 weight percent cellulose acetate (40% acetyl), about 20% sulfolane and about 13.3 weight percent tetraethylene glycol was extruded from a molten mass of the blend into the shape of a fine filamentary hollow fiber. The fiber was leached in water at 60° C. A control hollow fiber membrane was extruded from a blend of the cellulose acetate containing about 33.3% sulfolane but without the presence in the blend of any of the tetraethylene glycol. Upon testing the membranes, it was found that the hollow fiber membrane extruded from the blend containing the sulfolane and tetraethylene glycol had a salt rejection greater than 90% (i.e., more than 90% of the salt in the saline solution employed (about 3.5% sodium chloride) was restrained by the membrane) and was also observed to have a water permeability about six times greater than that obtained with the control hollow fiber membrane.

What is claimed is:

1. Method for making a separatory membrane comprising providing an intimate mixture of:
    (a) a film-forming cellulose organic ester, and
    (b) between about 15 to about 60 weight percent based on total composition weight of a combination of (1) a compatible plasticizer for the cellulose ester wherein said plasticizer is soluble in a solvent that is a nonsolvent for said cellulose ester, and (2) a polyol having a molecular weight from about 62 to about 20,000;
  fabricating a shaped membrane from a molten mass of the mixture of (a) and (b); and
  leaching said membrane with a solvent for said plasticizer and polyol that is a non-solvent for the cellulose ester.

2. The method of claim 1 wherein the weight ratio of said plasticizer to said polyol is from about 0.66:1 to about 5:1.

3. The method of claim 1 wherein the weight ratio of said plasticizer to said polyol is from 0.8:1 to about 1.3:1.

4. The method of claim 1 wherein said polyol has a molecular weight from about 106 to about 4,000.

5. The method of claim 1 wherein said cellulose ester is cellulose triacetate and said plasticizer is tetramethylene sulfone.

6. The method of claim 1 comprising leaching with an aqueous solution substantially all of the said plasticizer and polyol from said fabricated membrane.

7. Method for making a membrane suitable for use as a separatory membrane comprising providing an intimate mixture of:
    (a) a film-forming cellulose organic ester, and
    (b) between about 15 to about 60 weight percent based on total composition weight of a combination of (1) a compatible plasticizer for the cellulose ester selected from tetramethylene sulfone and ring-substituted derivatives thereof and (2) a polyol having a molecular weight from about 62 to about 20,000 in an amount such that the weight ratio of said plasticizer to polyol is from about 0.66:1 to about 5:1;

fabricating a shaped membrane from a molten mass of the mixture of (a) and (b); and leaching said membrane with a solvent for said plasticizer and polyol that is a non-solvent for the cellulose ester.

8. A composition suitable to be fabricated into a permeable membrane by hot melt extrusion techniques comprising:
(a) a film-forming cellulose organic ester; and
(b) between about 15 to about 60 weight percent based on total composition weight of a mixture of (1) a compatible plasticizer for said cellulose ester wherein said plasticizer is tetramethylene sulfone, ring substituted derivatives of said sulfone, dimethyl sulfoxide, 2-pyrolidone, gamma-butyrolactone, malononitrile, dibutyltartrate, dimethylphthalate, diethylphthalate, triacetin, triphenylphosphate, tributylphosphate, cyclic acetal, di-(methoxyethyl) phthalate, tetramethylene sulfoxide, caprolactam, gamma-valerolactone or mixtures thereof, and (2) a polyol having a molecular weight from about 62 to about 20,000 in an amount such that the weight ratio of said plasticizer to polyol is from about 0.66:1 to about 5:1.

9. A separatory membrane fabricated according to the process of claim 1.

10. The separatory membrane of claim 9 having a shape of a fine filamentary hollow fiber.

References Cited

UNITED STATES PATENTS

| | | | |
|---|---|---|---|
| 2,504,208 | 4/1950 | Locke et al. | 264—49 |
| 2,894,289 | 7/1959 | Harper et al. | 264—49 |
| 3,228,876 | 1/1966 | Mahon | 210—22 |
| 2,109,594 | 3/1938 | Macht | 106—176 |
| 2,435,071 | 1/1943 | Evans et al. | 106—176 |
| 2,460,233 | 1/1949 | Morris et al. | 106—176 |
| 2,504,099 | 4/1950 | Morris et al. | 106—176 |
| 2,697,046 | 12/1954 | Brandner | 106—176 |
| 2,942,994 | 6/1960 | Proell et al. | 106—189 |

FOREIGN PATENTS 745,896   3/1956   Great Britain.

OTHER REFERENCES

Office of Saline Water, Research and Development Progress Report No. 69, distributed by U.S. Department of Commerce, December 1962, Pages 7, 21, 26, 29, 30, 31.

ALLAN LIEBERMAN, Primary Examiner

U.S. Cl. X.R.

106—169, 177, 181, 189; 264—41, 176